United States Patent [19]

Himura et al.

[11] Patent Number: 4,963,121
[45] Date of Patent: Oct. 16, 1990

[54] LIQUID PRESSURE TENSIONER

[75] Inventors: Masato Himura; Hiroshi Suzuki, both of Hadano, Japan

[73] Assignee: Nittan Valve Co., Ltd., Tokyo, Japan

[21] Appl. No.: 425,048

[22] Filed: Oct. 20, 1989

[30] Foreign Application Priority Data

Sep. 7, 1987 [JP] Japan .................................. 62-135484

[51] Int. Cl.$^5$ .................................................. F16H 7/08
[52] U.S. Cl. .................................... 474/110; 474/111
[58] Field of Search ............... 474/101, 109, 110, 111, 474/113–117, 133, 135, 136, 138

[56] References Cited

U.S. PATENT DOCUMENTS

| 4,790,801 | 12/1988 | Schmidt et al. | 474/110 |
| 4,822,320 | 4/1989 | Suzuki | 474/111 |
| 4,881,927 | 11/1989 | Suzuki | 474/110 |

Primary Examiner—Thuy M. Bui
Attorney, Agent, or Firm—Michael F. Striker

[57] ABSTRACT

A liquid pressure tensioner for a driving gear mechanism and comprising a liquid pressure unit received within an open cavity of a tubular projecting member that slides along a tubular frame body and has an end portion which engages an endless member of the gear mechanism, the liquid pressure unit including two tubular members slidable relative to each other of which tubular members one member defines a reservoir for storing operating fluid received in a hollow space of the tubular frame body, a high pressure chamber formed between the two tubular members, a conduit for communicating fluid from the reservoir to the high pressure chamber, and a check valve in the conduit for preventing flow of the fluid from the high pressure chamber back to the reservoir.

6 Claims, 2 Drawing Sheets

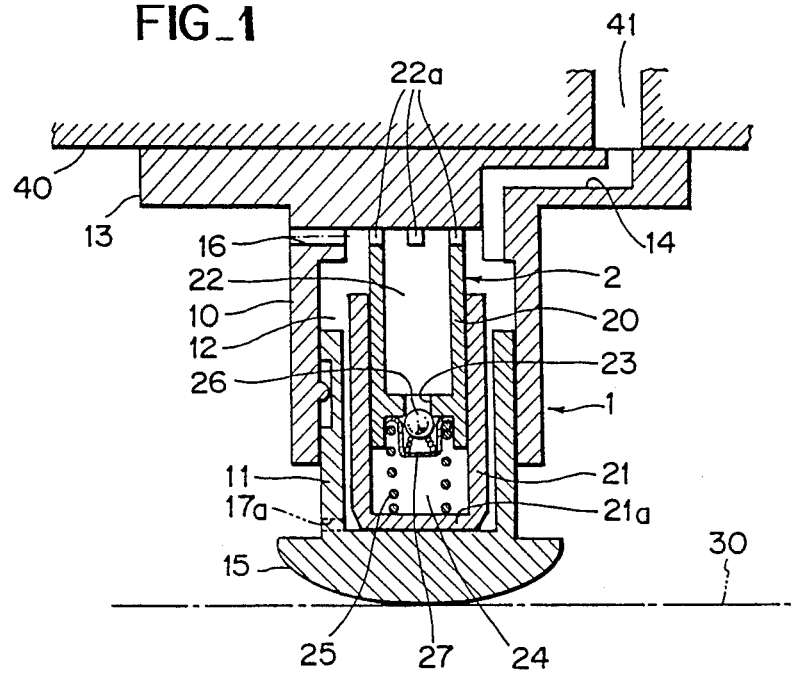
FIG_1
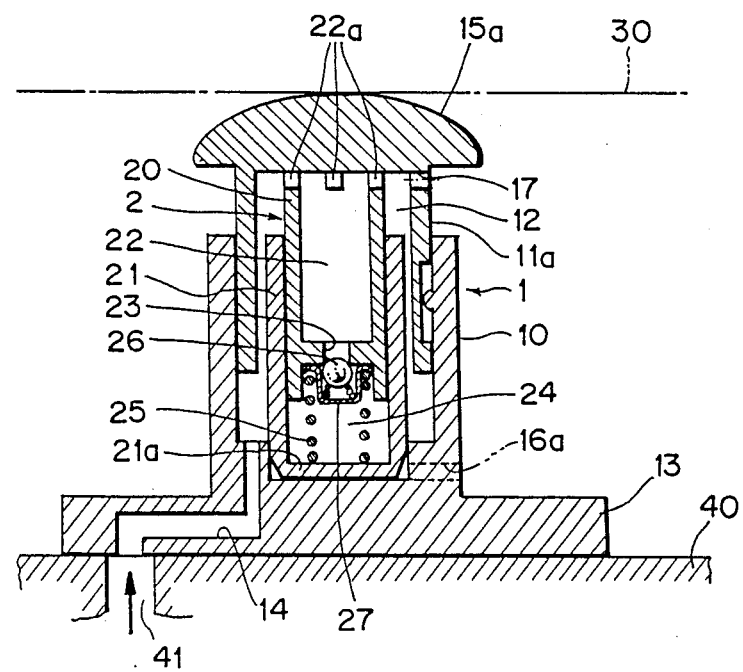
FIG_2

FIG_3
PRIOR ART
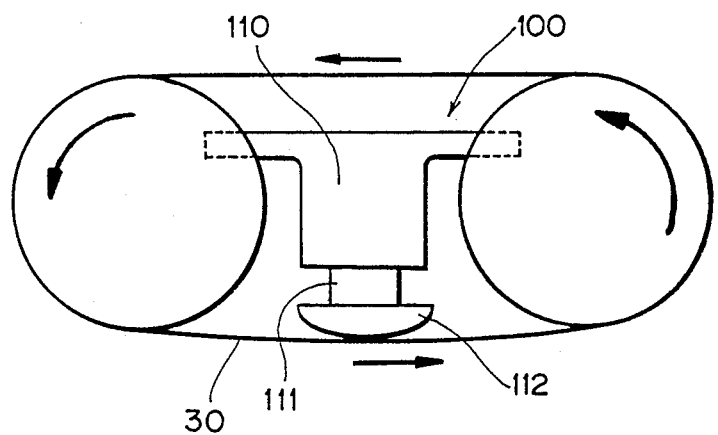
FIG_4
PRIOR ART
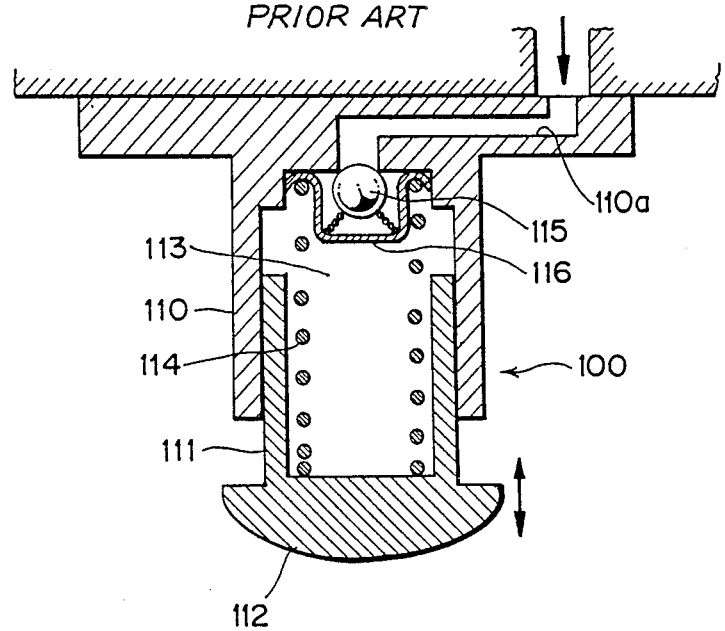

LIQUID PRESSURE TENSIONER

FIELD OF THE INVENTION

The present invention relates to a damper typed liquid pressure tensioner for a driving gear mechanism, which is used to prevent a chain or a belt from fluttering during operation.

BACKGROUND OF THE INVENTION

In a shaft-to-shaft driving gear mechanism, a chain or a toothed belt mesh with driving gears is used.

However in these mechanisms, the chain or the belt flutters or vibrates in addition to rotation at a constant speed. When the speed increases or varies, noises are generated, or the chain is often broken. Especially the chain much makes such troubles caused by abrasion expansion.

To prevent noises and/or chain destruction, in general, tensioners are installed so as to apply suitable pressure to the chain or the belt. The tensioners are divided into two main types. One of them is a no-back system which avoids only loosening of the chain and comprises a pressing element arranged not to return to an original place, and the other is a damper type which mainly prevents fluttering and presses the chain or the belt only if required.

FIG. 3 shows a damper typed tensioner 100 positioned against a timing chain 30 of an internal combustion engine, and FIG. 4 shows a structure of a hydraulically operated damper type tensioner. This tensioner 100 is provided integrally with a hydraulically operated mechanism built in a main body thereof. A detailed explanation is made hereinafter.

The tensioner main body is composed of a tubular frame body 110 which is fixed at a required position for supplying a fluid such as a lubricant via a liquid path 110a, and a tubular projection member 111 which is slidably fitted into the body 110 and whose closed end forms a slip face 112 to press against a chain 30 and whose other end is open.

A hollow space defined between the projection member 111 and the frame body 110 is served as a high pressure chamber 113 where the operating liquid is filled from the path 110a, and an elastic member 114 is expanded, and further a check ball valve 115 and a cage 116 are furnished, the former opening and closing the liquid path 110a and the latter supporting the former, whereby a hydraulically operated mechanism of the tensioner main body is built.

The timing chain 30 slides directly on the slip face 112, and if the chain 30 flutters and hits the slip face 112, the tensioner main body is displaced. At the same time, when the operating liquid filled in the high pressure chamber is subjected to pressure, the operating liquid is compressed and then the tensioner main body is not further displaceable.

On the other hand, when the timing chain 30 is separated from the slip surface 112, and the pressure is released, the elastic member 114 within the chamber 113 is expanded, and the tensioner main body is extended in an opposite direction. Thus the damper typed tensioner 100 is compressed and its length is reduced by the operating liquid when the pressure is applied to the operating liquid.

The elastic member 114 extends the tensioner when the pressure is released, so that the slip surface 112 follows the fluttering or vibration of the timing chain 30 and damps it.

However, in the tensioner having the above mentioned structure, while the chain or belt slides on the slip face 112, a large side load is applied to the sliding side surface between the tubular frame body 110 and the projecting member 111. Under such a condition, if fluttering of the chain or the belt, the abrasion of the sliding side surface is accelerated and causes problems such as bitings between the body 110 and the member 111 when the projection member 111 moves upward. If the abrasion of the sliding surface grows, a clearance between the body 110 and the projecting member becomes uneven, and the operating liquid leaks substantially from the high pressure chamber 113 and adversely affects the operation by the liquid pressure of the tensioner 100.

If the tubular frame body 110 or the projection member 111 is formed with a hole for purging outside the air from an aerated liquid, the liquid escapes through this hole, and therefore the air hole cannot be formed in the tensioner main body. Thus, the air mixes easily with the operating fluid, and the damping effect is lowered in the above conventional structure.

For these reasons, the flutter preventing function is lowered in the conventional damper typed tensioner, and the chain or the belt hits the slip surface 112 and makes big noises. The worst matter is break of the chain or the belt.

SUMMARY OF THE INVENTION

The object of the present invention is to eliminate or at least reduce the above mentioned problems by modifying the structure of the damper type liquid pressure tensioner.

The object of the invention is achieved by separating the mechanism of the tensioner main body and the hydraulically operated mechanism.

That is, the tensioner main body is cmposed of a tubular frame body which is secured at a required position and is supplied thereinto with the operating liquid and whose one end opens, and a tubular projecting member which is slidably mounted at the inside or on the outside of the tubular frame body and whose closed end defines a slip surface to be pressed against the chain or the belt and whose other end is open. The two tubular bodies with one opening at one end are slidably fitted one within the other, and the hollow space of one of the opening ends is served as a reservoir for storing the operating liquid supplied to the tubular frame body. The hollow space defined between the two bodies, is served as a high pressure chamber communicating with the reservoir through a liquid hole. An elastic member is interposed within the high pressure chamber which also has a check ball valve that opens and closes the liquid hole, and a check valve cage supporting the ball. Thereby a liquid pressure unit independent of the tensioner main body and defining a liquid pressure operating mechanism is provided.

The present invention is characterized by inserting the liquid pressure unit into the hollow space defined between the projecting member and the tubular frame body, as the reservoir is faced upwards.

Thus, since the tensioner main body and the liquid pressure unit are independent, the tubular body or projecting member having the air hole may be used in the tensioner.

In the embodiment where the slip surface of the projecting member facing upwards is provided in the tensioner main body, the air mixed in the operating liquid moves to the upper part of the hollow space of the tensioner, and the air may be purged efficiently through the projecting member having the air hole at the upper part thereof.

As said above, by providing separately the tensioner main body and the liquid pressure unit, a side load is received by the tensioner main body only. Thereby the influence on the liquid pressure unit of the side load is eliminated. As the reservoir is furnished to the liquid pressure unit, the operating liquid is separated from the air so that the damping effect of the air mixed with liquid is avoided. In the conventional structure, the air hole could not be formed as said above, and if the slip surface of the projecting member is provided as it faces upwards, a desired damping effect could not be obtained because of the air mixed with liquid. But in the device of the invention, as the air hole may be formed in the tensioner main body, the desired damping effect may be always expected even if the slip surfaces faces upward.

The present invention as to its construction so to its mode of operation, together with additional objects and advantages thereof, will be best understood from the following detailed description when read with reference to the accompanying drawings.

BRIEF DESCRIPTION OF THE DRAWINGS

FIG. 1 is a cross-sectional view of a hydraulically operated tensioner according to a first embodiment of the present invention;

FIG. 2 is a cross-sectional view showing of a hydraulically operated tensioner according to a second embodiment of the present invention;

FIG. 3 is schematic side elevation view showing a prior art tensioner of a damper type; and FIG. 4 is a cross-sectional view showing a conventional hydraulically operated tensioner of a damper type.

DETAILED DESCRIPTION OF PREFERRED EMBODIMENTS

Embodiments of the invention will be explained with reference to the attached drawings.

FIG. 1 is a cross-sectional view showing an oil pressure tensioner of a damper type according to a first embodiment of the invention, provided for a timing chain 30 of an automobile engine, where a reference numeral 40 designates a frame of an engine main body to be installed with the tensioner, and a reference numeral 41 designates an oil feed passage for a lubricant from the engine.

As shown, the tensioner main body 1 comprises a tubular frame body 10 with a mouth opening downward. The body 10 is fixed to the frame body 40. A tubular projecting member 11 with a mouth opening upwards is slidably fitted to the inner side of the mouth of the body 10.

The tubular frame body 10 is provided with a channel 14 formed in a seat 13 fixed to the frame body 40 for supplying the lubricant thereinto, the channel 14 communicating with the oil feed passage 41. The projecting member 11 is provided with a portion made of a rubber or a constructional plastic material at its closing end and having a rectangular slip face 15 for sliding the timing chain 30.

An oil pressure unit 2 is inserted in a hollow space 12 formed in the frame body 10. The oil pressure unit 2 comprises two tubular bodies, a plunger 20 and a body 21 with both being opened at one ends. The hollow space of the plunger 20 is a reservoir 22 for storing the oil having overflow recesses 22a at the upper part. The space between the fitted plunger 20 and the body 21 is a high pressure chamber 24 communicating with the reservoir 22 through an oil hole 23 formed in the bottom of the plunger 20. A spring 25 is located in the chamber 24 to press the body 21 downwards. A check ball valve 26 is provided for opening and closing the oil hole 23. A cage 27 supports the ball valve in the bottom of the plunger 20. Within the hollow space 12 of the tension body 1, the oil pressure unit 2 is inserted with its reservoir 22 facing upwards.

The tensioner according to the first embodiment is formed with an air hole 16 at the same level as the overflow recesses 22a, at the upper part of the tubular frame body 10 and is spaced from reservoir 22 to exhaust outside the air stored in the hollow part 12 of the tensioner main body 1.

A further reference will be made to operation of the above described tensioner.

The lubricant fed from the engine when driving, is supplied into the hollow space 12 of the tensioner main body 1 via the oil feed hole 41 and the communication channel 14, and further into the reservoir 22 via the overflow recesses 22a. The lubricant enters the chamber 24 from the reservoir 22 via the oil hole 23.

On the other hand, the timing chain 30 slides on the slip face 15 upon displacement in a guide channel during driving the engine. Since the side load generated thereby is received by the side sliding surface between the projecting member 11 and the tubular frame body 10, it does not influence the oil pressure unit 2. If the timing chain 30 flutters when the engine starts or stops, it moves up and down and hits the slip face 15 to push the projecting member 11 into the tubular frame body 10. At this time, the lubricant in the chamber 24 of the oil pressure unit 2 is compressed, and a part thereof leaks into the reservoir 22. Concurrently, a part of the lubricant that remains in the hollow space 12 of the tensioner main body 1 escapes from the sliding surface between the frame body 10 and the projecting member 11. When the oil hole 23 is closed by the ceck valve ball 26, the lubricant in the chamber 24 is perfectly closed, the lubricant is compressed as the oil pressure increases, so as to stop further pushing of the projecting member 11. When the timing chain 30 separates from the slip face 15 and the pressure is released, the projecting member 11 is pushed back in the original direction by the return force of the spring 25 expanded in the chamber 24, and the slip face 15 follows actions of the timing chain 30. At the same time, the pressure within the chamber 24 decreases, and the check valve ball 26 is separated from the oil hole 23, and the amount of the lubricant that leaked at compression, is compensated within the chamber 24 through the oil hole 23.

The air in the lubricant moves upwards in the hollow space 12 of the tensioner main body while it is supported in the reservoir 22, and it is separated at the upper space of the hollow part 12 and escapes outside through the overflow recesses 22a and the air hole 16.

When the timing chain 30 is rotated at the constant speed, it moves in a determined direction as sliding on the slip face without fluttering. But, when the timing chain 30 is elongated and flutters, the tensioner operates as said above.

FIG. 2 is a cross sectional view showing an oil pressure tensioner of a damper type of a second embodiment of the invention, wherein a slip face 15a of a projecting member 11a faces upwards.

The second embodiment has almost the same structure as the first embodiment and is assigned the same reference numerals, except that an air hole 17 is formed at about the upper portion of the projecting member 11a, and the slip face 15a is circular like a mushroom.

The air mixed in the lubricant is separated in the reservoir 22, and is stored at the upper space of the hollow part 12 and is released outside via the air hole 17. Since the slip face 15a is like the mushroom as said above and if the projecting member 11a is therefore rotated laterally due to some plays, the contacting part in relation with the timing chain 30 always keeps the same condition.

As is seen from a comparision with the structure of the second embodiment, a hole 17a is formed, as shown with dotted lines, at the side of the projecting member 15, and if a hole 16a is formed as shown with dotted lines similarly at the side of the tubular frame body 10, the both will have the same structures only excepting that the oil pressure unit 2 is inserted upside down.

Accordingly, it is no longer necessary to employ different parts due to a position of furnishing the tensioner, and production costs may be lowered by using common parts.

While the invention has been illustrated and described as embodied in a tensioner of a driving gear, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint or prior art, fairly constitute essential characteristics of the generic or specific aspects of this invention.

What is claimed as new and desired to be protected by Letters Patent is set forth in the appended claims:

1. A liquid pressure tensioner for a driving gear mechanism including an endless member engaging driving and driven gears, said tensioner comprising a tubular frame body having an inner surface defining a hollow space for receiving an operating fluid, an outer surface, and an open end; a tubular projecting member slidably displaceable along one of said inner and outer surfaces and including an end portion projecting beyond said open end of said tubular frame body and having a slip end surface for engaging the endless member and an open cavity; and a liquid pressure unit received at least partially within said open cavity of said tubular projecting member and including a first tubular member defining a reservoir for storing the operating fluid, a second tubular member slidable relative to said first tubular member, a variable hollow space formed between said first and second tubular members and defining a higher pressure chamber, conduit means for communicating said reservoir with said high pressure chamber, and check valve means located in said conduit means to prevent flow of fluid from said high pressure chamber into said reservoir.

2. A liquid pressure tensioner as set forth in claim 1, wherein said first tubular member has a bottom, said conduit means comprising an opening formed in said bottom, and said check valve means including a ball for closing said opening and a cage for supporting said ball on said first tubular member.

3. A liquid pressure tensioner as set forth in claim 1, further comprising a spring located in said high pressure chamber for biasing said first and second tubular members away from each other.

4. A liquid pressure tensioner as set forth in claim 1, further comprising means for communicating said hollow space of said tubular frame body and said reservoir.

5. A liquid pressure tensioner as set forth in claim 1, further comprising means for evacuating air from said hollow space of said tubular frame member.

6. A liquid pressure tensioner as set forth in claim 5, wherein said tubular frame body has a wall portion defining said hollow space, said evacuating means comprising a first transverse opening formed in said wall portion in a spaced relationship to said opne end and communicating with said hollow space for evacuating the air therefrom outside of said liquid pressure tensioner, and a second transverse opening formed in said tubular projecting member adjacent to said end portion thereof and adapted to communicate with said hollow space in an upward position of said tubular projecting member for evacuating the air from said hollow space.

* * * * *